July 8, 1930.  F. AESCHBACH  1,770,292

DOUGH MIXING AND KNEADING MACHINE

Filed Sept. 12, 1929  2 Sheets-Sheet 1

INVENTOR:
Friedrich Aeschbach,
By [signature]
Atty.

July 8, 1930. F. AESCHBACH 1,770,292

DOUGH MIXING AND KNEADING MACHINE

Filed Sept. 12, 1929 2 Sheets-Sheet 2

INVENTOR:
Friedrich Aeschbach,
By Henry Ortly
Atty.

Patented July 8, 1930

1,770,292

UNITED STATES PATENT OFFICE

FRIEDRICH AESCHBACH, OF AARAU, SWITZERLAND

DOUGH MIXING AND KNEADING MACHINE

Application filed September 12, 1929, Serial No. 392,216, and in Switzerland August 7, 1929.

The present invention relates to a safety device in dough mixing and kneading machines, having two guides for working arms, such as a mixing arm and a kneading arm respectively, each of the arms being provided with fingers and movable along intercrossing paths and adapted to be lifted above the trough by means of a rack and pinion.

The object of the invention is to eliminate a possible collision between the fingers of the two arms in their various positions, particularly, when the mixing arm is raised and when during the last working period for the dough the kneading arm alone is required to be operative.

For this purpose, in the safety device according to the invention, the hub of the guide for the kneading arm is rotatably mounted on the one end of the hub of the guide for the mixing arm, said hubs being mounted on a common pivot pin and arranged thereon to leave between two of their end faces, which are each provided with two notches, a free hub portion on which are mounted two lever arms engaging the mixing and kneading arm respectively and in the boss of each of which two pins are displaceably arranged which bear on an intermediate distance ring, whereby, the invariable length of the free hub portion is so defined that at all times the pins of the one lever arm must enter the notches in the adjacent shoulder portion of the hub in order to permit a swiveling motion of the other lever arm or a respective longitudinal displacement of the corresponding working arm, controlled thereby, together with its pertaining finger.

Owing to this arrangement the two working arms are adapted to be locked relatively to each other in such manner that the kneading arm is enabled to be lifted only when the mixing arm is in its topmost position, that during the lifting motion of the mixing arm the kneading arm remains in its lowermost position, and that when both working arms take up their topmost positions the mixing arm only is prevented from being lowered.

In the drawing an embodiment of the invention is shown by way of example, in which Fig. 1 is a side elevation of a dough mixing and kneading machine;

Figure 1:
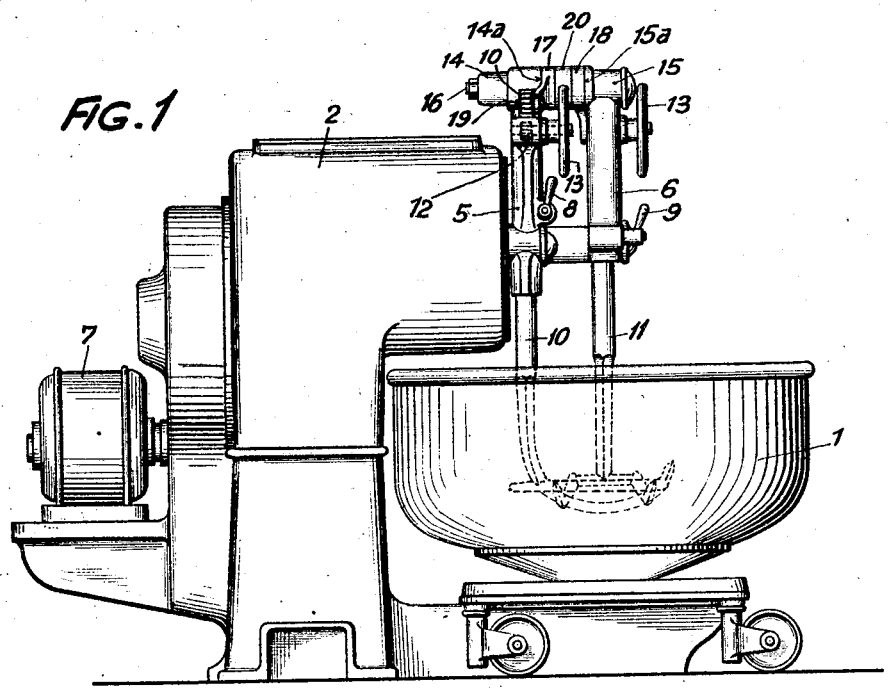
Figure 2:
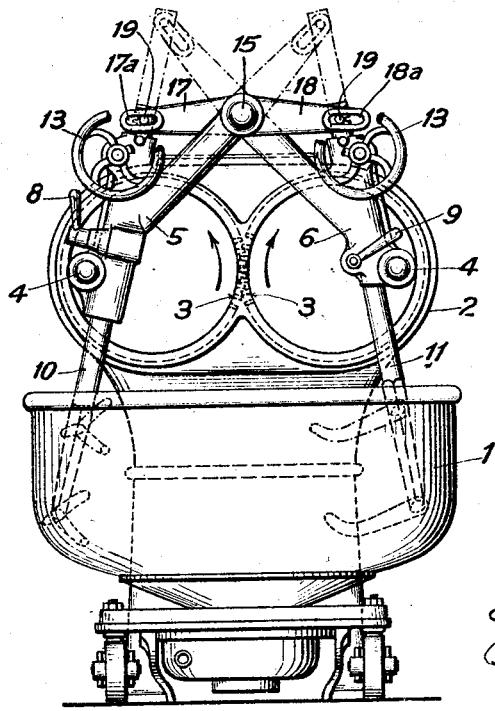
Fig. 2 is a front view of the same.

In the machine illustrated, 1 designates the wheelable trough and 2 the machine frame with its upper portion projecting above the trough. On the front side of the machine frame two intermeshing spur gear wheels 3 are mounted beside each other to which, in a known manner, the guide 5 for the kneading arm and the guide 6 for the mixing arm are linked, by means of eccentric pins 4, so as to be disposed behind each other in two different planes. The said spur gear wheels are driven by the electro-motor 7 by means of a gearing housed in the machine frame. In the guides 5 and 6 the kneading arm 10 and the mixing arm 11, of known construction, are displaceably arranged and adapted to be fixed in position by clamp screws 8, 9. The working arms 10, 11 are designed as racks to mesh each with a corresponding pinion 12 mounted at the upper end of the pertaining guide so as to be rotatable from outside by means of a hand wheel 13. The hub 14 of the guide for the kneading arm 10 and the hub 15 of the guide for the mixing arm 11 are mounted on a common pivot pin 16, such wise, that the hub 14 surrounds the hub 15 on a portion of its length. On the free portion of the hub 15 two lever arms 17 and 18 are rotatably arranged and each lever arm is formed at its one end with a slot $17^a$ or $18^a$ respectively in which engages a guide pin 19, fixed to each working arm 10, 11. Between the bosses of the two lever arms 17, 18, a distance ring 20 is displaceably carried by the hub 15 adjacent to both end faces of which diametrically opposed pins 21, 21 and 22, 22 respectively are arranged, the one end portion of which is eased off spherically and which are longitudinally displaceable in corresponding bores in the bosses of the lever arms 17 and 18. The shoulder portions $14^a$ and 15ª of the hubs 14 and 15 are provided with corresponding spaced notches of spherical shape fitting with the ends of the pins 21, 22. Thereby, the distance between the end faces of the shoulder portions 14ª and 15ª of the hubs 14 and 15 is so defined that the pins must enter the notches either on the one side or on the other.

Figure 3:
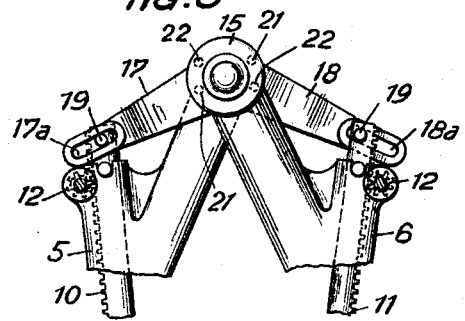
Figs. 3–8 show, on a larger scale in elevation and in horizontal section respectively, a part of the gearing in three different positions.
Figure 4:
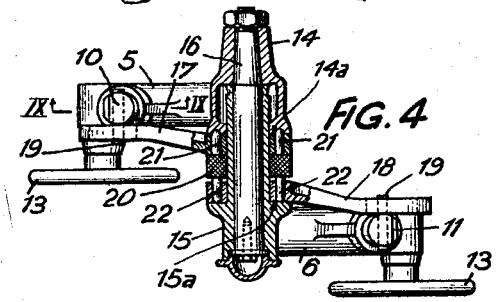

The operation of the described mechanism is as follows:

In the position shown in Figs. 3 and 4 wherein both working arms are lowered into their operative position it is impossible to lift the kneading arm 10 in that the pins 21, 21 of the ring 20 enter the notches for the lever arm 17, whereby the said arm is prevented from being raised. On the other hand the mixing arm 11 is enabled to be lifted in that the pins 22, 22 clear their respective notches in the hub 15.

Figure 5:
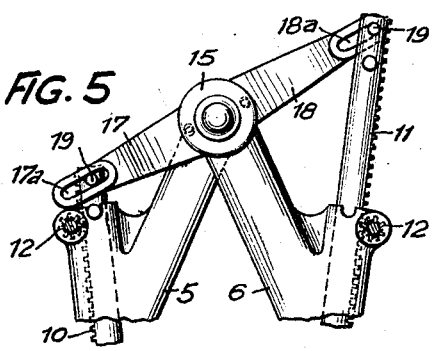
Figure 9:
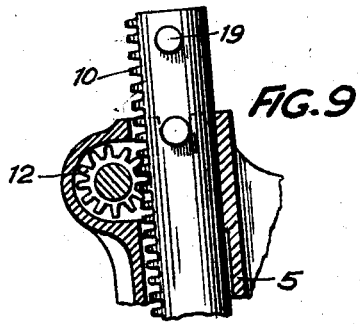
Fig. 9 is a section on the line IX—IX in Fig. 4, on a larger scale.
Figure 6:
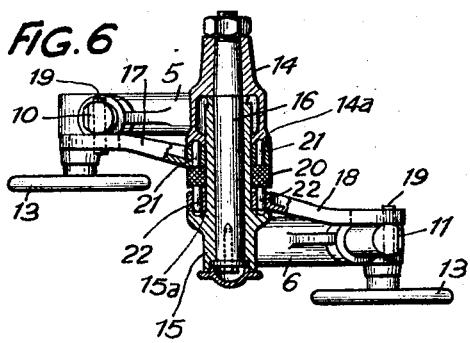

In the position shown in Figs. 5 and 6, the mixing arm is raised in order to enable the kneading arm to work alone and, thereby, the lever arm 18 is turned so as to move the pertaining pins 22 opposite the corresponding notches to permit them to enter the same. At this time, the kneading arm 10 is enabled to be raised also in that by doing so, the turning motion of the lever arm 17 effects the disengagement of the pins 21 from their corresponding notches and consequently a shifting of the ring 20 and the pins 22 towards the mixing arm until the latter are firmly engaged in their respective notches so that the mixing arm 11 is kept from moving.

Figure 7:
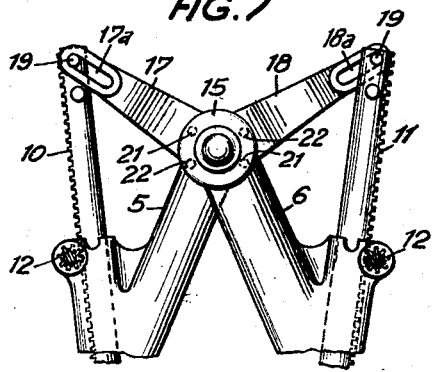
Figure 8:
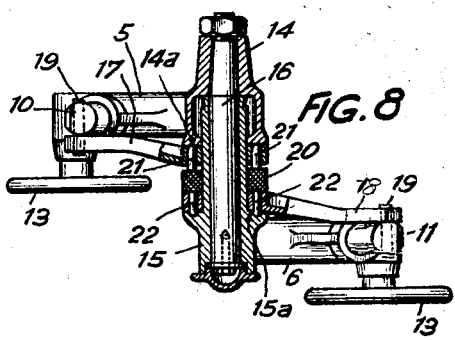

In the position shown in the Figs. 7 and 8 the kneading arm 10 is raised and the mixing arm 11 which is also in its topmost position is locked by the pins 22, 22 so as to be prevented from being lowered before the kneading arm is again moved into its lowermost position.

From the Figs. 3 and 4 follows that the mixing arm 11, during the finishing treatment of the dough, is apt to be raised in any position, whilst the kneading arm remains locked in its lowest position of adjustment. Therefore, collision between the working arms and their pertaining fingers is rendered entirely impossible in any position of the same.

I claim:

1. In a dough mixing and kneading machine comprising, a trough, a mixing arm, a kneading arm, said working arms being movable along intercrossing paths and adapted to be raised above the said trough, a guide for each of the said working arms, a hub on each of the said guides, a common pivot for the said two hubs, a shoulder portion on each of the said hubs, two lever arms operatively connected to the said working arms, a boss on each of the said lever arms, said bosses being turnable about said common pivot between the end faces of the said shoulder portions, and means for selectively connecting the one lever arm to the pertaining guide so as to prevent the correspondingly working arm from moving relatively to the said guide and to permit a swivelling motion of the other lever arm or a respective movement of its corresponding working arm relatively to its guide, in order to avoid collision between two working arms.

2. In a dough mixing and kneading machine, comprising a trough, a mixing arm, a kneading arm, said working arms being movable along intercrossing paths and adapted to be raised above the said trough, a guide pin on each of the said working arms, a guide for each of the said working arms, means for longitudinally adjusting the same in the said guides, a hub on each of the said guides, a common pivot for the said two hubs, an extended end portion on the one hub to carry the other, a shoulder portion on each of the said hubs, two lever arms, a longitudinal slot formed in each of the said lever arms for engaging the said guide pin on the pertaining working arm, a boss on each of the said lever arms, said bosses being turnable about said common pivot between the end faces of the said shoulder portions and means for selectively connecting the one lever arm to the pertaining guide so as to present the corresponding working arm from moving relatively to the said guide and to permit a swivelling motion of the other lever arm or a respective movement of its corresponding working arm relatively to its guide, in order to avoid collision between the two working arms.

3. In a dough mixing and kneading machine comprising, a trough, a mixing arm, a kneading arm, said working arms being movable along intercrossing paths and adapted to be raised above the said trough, a guide pin on each of the said working arms, a guide for each of the said working arms, means for longitudinally adjusting the same in the said guides, a hub on each of the said guides, a common pivot for the said two hubs, an extended end portion on the one hub to carry the other, a shoulder portion on each of the said hubs, two notches in the end face of each of the said shoulder portions, two lever arms, a longitudinal slot formed in each of the said lever arms for engaging the said guide pin on the pertaining working arm, a boss on each of the said lever arms, said bosses being turnable about said common pivot between the end faces of the said shoulder portions, two axial bores in each of the said bosses, a pair of pins for each boss, displaceably arranged in the bores thereof and adapted to engage the two notches in the end face of the adjacent shoulder portion with their one end, a distance ring arranged on the said extended hub portion, intermediate of the two bosses, for the said pins to bear on, whereby, the invariable distance between the two end faces of the said shoulder portions is so defined that at all times the pins of the one lever arm must enter the notches in the adjacent shoulder portion of the hub in order to permit a swivelling motion of the other lever arm or a respective movement of the corresponding working arm relatively to its guide.

4. In a dough mixing and kneading machine comprising, a trough, a mixing arm, a kneading arm, said working arms being movable along intercrossing paths and adapted to be raised above the said trough, a guide pin on each of the said working arms, a guide for each of the said working arms, means for longitudinally adjusting the same in the said guides, a hub on each of the said guides, a common pivot pin for the said two hubs, an extended end portion on the one hub to carry the other, a shoulder portion on each of the said hubs, two notches in the end face of each of the said shoulder portions, said notches being of hollow spherical shape, two lever arms, a longitudinal slot formed in each of the said lever arms for engaging the said guide pin on the pertaining working arm, a boss on each of the said lever arms, said bosses being turnable about said common pivot pin between the end faces of the said shoulder portions, two axial bores in each of the said bosses, a pair of pins for each boss, displaceably arranged in the bores thereof and adapted to engage the two notches in the end face of the adjacent shoulder portion with their one end, said ends being eased off spherically, a distance ring arranged on the said extended hub portion, intermediate of the two bosses, for the said pins to bear on, whereby, the invariable distance between the two end faces of the said shoulder portions is so defined that at all times the pins of the one lever arm must enter the notches in the adjacent shoulder portion of the hub in order to permit a swivelling motion of the other lever arm or a respective movement of the corresponding working arm relatively to its guide.

In testimony whereof I have signed my name to this specification.

FRIEDRICH AESCHBACH.